US00RE43928E

(19) United States
(12) Reissued Patent
Clouse et al.

(10) Patent Number: US RE43,928 E
(45) Date of Reissued Patent: Jan. 15, 2013

(54) BORESCOPE INSPECTION PORT DEVICE FOR GAS TURBINE ENGINE AND GAS TURBINE ENGINE USING SAME

(75) Inventors: Brian Ellis Clouse, Saugus, MA (US); David P. Dube, Saco, ME (US)

(73) Assignee: United Technologies Corporation, Hartford, CT (US)

(21) Appl. No.: 13/171,708

(22) Filed: Jun. 29, 2011

Related U.S. Patent Documents

Reissue of:
(64) Patent No.: 7,458,768
Issued: Dec. 2, 2008
Appl. No.: 11/170,357
Filed: Jun. 28, 2005

(51) Int. Cl.
*F04D 29/00* (2006.01)

(52) U.S. Cl. ..... 415/115; 415/201

(58) Field of Classification Search ..... 415/115, 415/201, 118; 439/564, 563, 569, 573
See application file for complete search history.

(56) References Cited

U.S. PATENT DOCUMENTS

| | | | |
|---|---|---|---|
| 4,184,743 | A | 1/1980 | Baker et al. |
| 4,298,312 | A | 11/1981 | MacKenzie et al. |
| 4,655,682 | A | 4/1987 | Kunz et al. |
| 4,666,297 | A | 5/1987 | Suarez-Gonzalez |
| 5,224,824 | A | 7/1993 | Eng |
| 5,421,652 | A | 6/1995 | Kast et al. |
| 5,653,581 | A | 8/1997 | Dixon et al. |
| 5,709,530 | A | 1/1998 | Cahill et al. |
| 5,839,878 | A | 11/1998 | Maier |
| 6,164,904 | A | 12/2000 | Abriles et al. |
| 6,447,332 | B1 | 9/2002 | Djian |
| 6,585,479 | B2 | 7/2003 | Torrance |
| 6,607,355 | B2 | 8/2003 | Cunha et al. |

FOREIGN PATENT DOCUMENTS

GB 2033973 A * 5/1980

* cited by examiner

*Primary Examiner* — Dwayne J White
(74) *Attorney, Agent, or Firm* — Carlson, Gaskey & Olds, P.C.

(57) ABSTRACT

An adapter to permit borescope access inside a gas turbine engine including a compressor stator having a plurality of compressor stator segments comprises a body portion defining a bore extending longitudinally therethrough from a first end to be disposed adjacent to outside surfaces of adjacent compressor stator segments to a second end to be disposed adjacent to inside surfaces of adjacent compressor stator segments. The bore permits a borescope to enter therethrough. The adapter further comprises an attachment portion for circumferentially coupling at least one compressor stator segment to an outer casing of the gas turbine engine.

20 Claims, 3 Drawing Sheets

BORESCOPE INSPECTION PORT DEVICE FOR GAS TURBINE ENGINE AND GAS TURBINE ENGINE USING SAME

Matter enclosed in heavy brackets [ ] appears in the original patent but forms no part of this reissue specification; matter printed in italics indicates the additions made by reissue.

This invention was made with Government support under N00019-02-C-3003 awarded by the United States Navy. The Government has certain rights in this invention.

FIELD OF THE INVENTION

This invention relates generally to gas turbine engines, and more particularly to borescope inspection port devices for gas turbine engines.

BACKGROUND OF THE INVENTION

Gas turbine engines are commonly equipped with pluggable holes in their outer casings to allow use of borescopes. These are fiber-optic devices that allow visual inspection of the interior of the engine without disassembling it, which is a major advantage to operators. However, the presence of the hole in the casing tends to locally disrupt the smooth flow of air through the engine along the casing walls. It can also be a path of leakage of high-pressure air into areas where it does not contribute to the engine's performance. This is true even though the ports are filled with a plug that is removed for borescope access, since the fit of the plug may not be—and normally is not—perfect.

Because the borescope access hole typically penetrates more than one component of a gas turbine engine, some allowance must be made for variations in the location of the hole in each of these components. This is usually accomplished by making the holes larger than they would otherwise need to be for borescope access. The increased size of the holes aggravates the airflow disruption and leakage problem.

One common design for a gas turbine engine compressor uses multiple segments of stator vanes inserted into the casing. Design features, such as anti-rotation lugs, fix the stator segments into the casing circumferentially, preventing them from spinning in place. Although this approach provides a number of advantages, it adds a part into the "stack" of engine parts through which the borescope access port must penetrate. The port's location is normally fixed by the locations and designs of the engine components on the outside of the casings, and of the aircraft or other location in which the engine is installed. The further away from the anti-rotation lugs the stator segments' borescope port is placed, the more variation there can be in the port's location relative to the external features, which usually are used to locate the removable plug itself.

Accordingly, it is an object of the present invention to provide a borescope port and gas turbine engine incorporating such port that overcomes the above-mentioned drawbacks and disadvantages.

SUMMARY OF THE INVENTION

In a first aspect of the present invention, an adapter, to permit borescope access inside a gas turbine engine having an outer casing including a Compressor stator having at least one compressor stator segment, comprises a body portion defining a bore extending longitudinally therethrough from a first end to be disposed adjacent to outside surfaces of the outer casing to a second end to be disposed adjacent to an inside surface of the at least one compressor stator segment. The bore permits a borescope to enter therethrough. The adapter further comprises an attachment portion for circumferentially coupling the at least one compressor stator segment to the outer casing.

In a second aspect of the present invention, a gas turbine engine comprises a compressor section having an outer casing and includes a compressor stator and rotor. The compressor stator includes a plurality of compressor stator segments. A combustion section communicates with and is disposed downstream of the compressor section relative to a direction of airflow. A gas turbine section communicates with and is disposed downstream of the combustion section relative to a direction of airflow. An adapter circumferentially couples at least one of the compressor stator segments to the outer casing. The adapter includes a body portion defining a bore extending therethrough from at least an outside surface to an inside surface of an associated compressor stator segment. The bore permits a borescope to enter therethrough.

DETAILED DESCRIPTION OF THE PREFERRED EMBODIMENT

Figure 1:
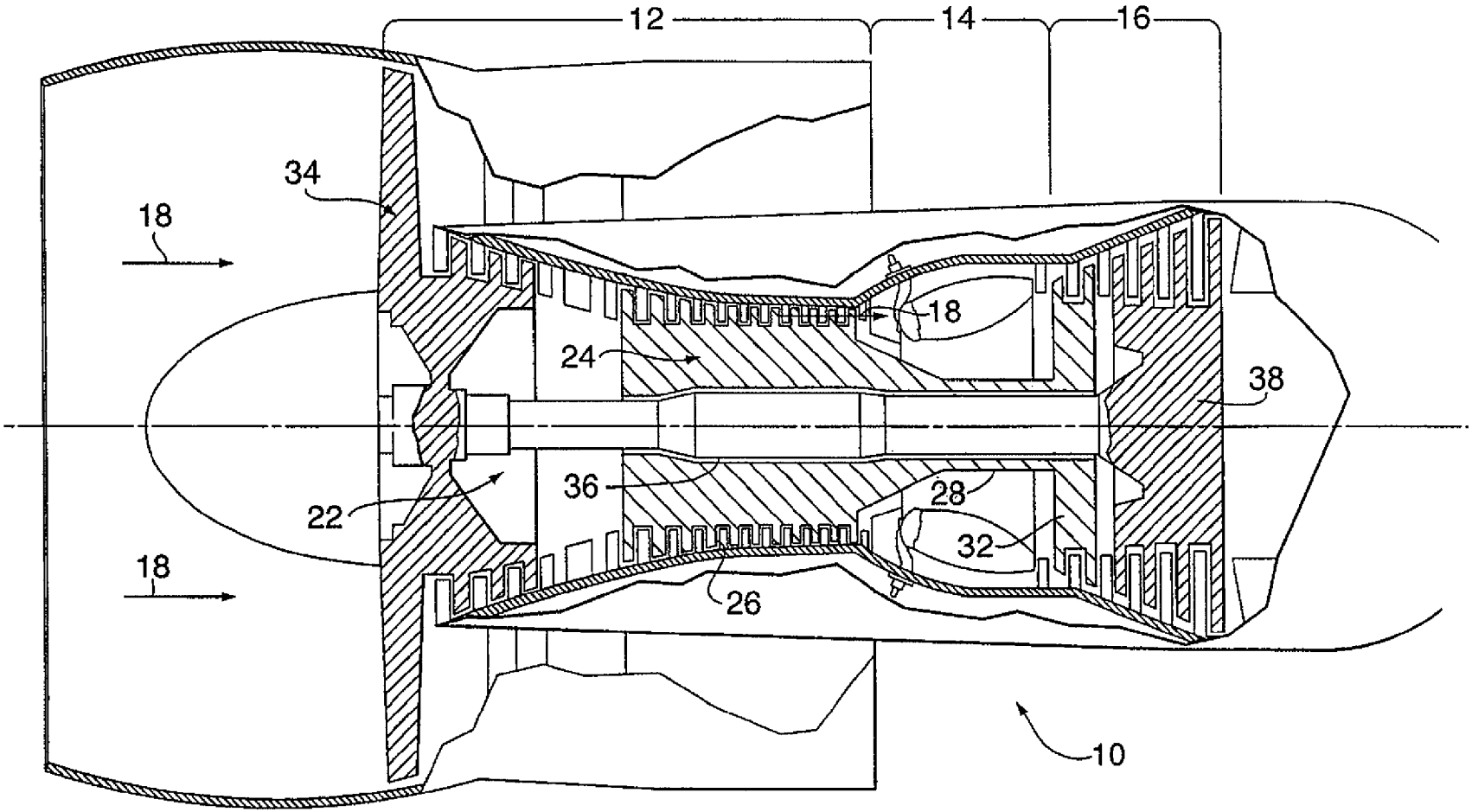
FIG. 1 is a side elevational schematic view of a gas turbine engine with the engine partially broken away to show a portion of the compressor section of the engine.

FIG. 1 is a side elevation, simplified view of an example of a gas turbine engine 10. The view is partially broken away to show elements of the interior of the engine. The engine 10 includes a compression section 12, a combustion section 14 and a turbine section 16. An airflow path 18 for working medium gases extends axially through the engine 10. The engine 10 includes a first, low pressure rotor assembly 22 and a second, high pressure rotor assembly 24. The high pressure rotor assembly 24 includes a high pressure compressor 26 connected by a shaft 28 to a high pressure turbine 32. The low pressure rotor assembly 22 includes a fan and low pressure compressor 34 connected by a shaft 36 to a low pressure turbine 38. During operation of the engine 10, working medium gases are flowed along the airflow path 18 through the low pressure compressor 26 and the high pressure compressor 34. The gases are mixed with fuel in the combustion section 14 and burned to add energy to the gases. The high pressure working medium gases are discharged from the combustion section 14 to the turbine section 16. Energy from the low pressure turbine 38 and the high pressure turbine 32 is transferred through their respective shafts 36, 28 to the low pressure compressor 34 and the high pressure compressor 26.

Figure 2:
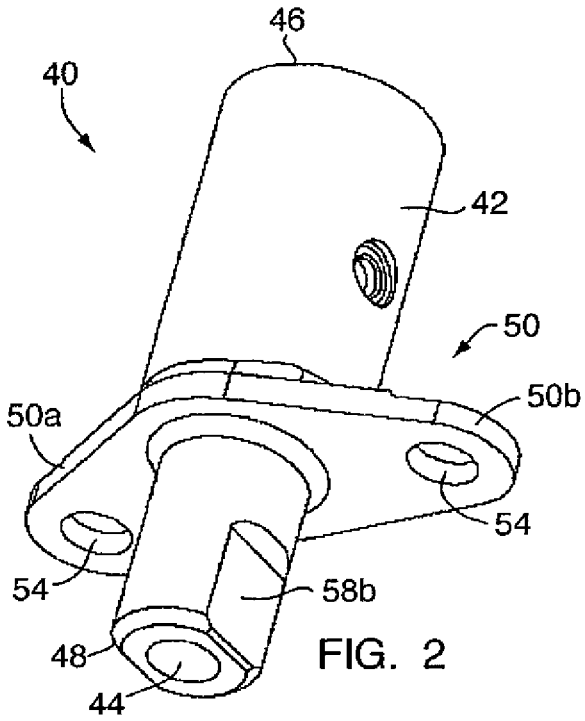
FIG. 2 is a perspective view of an adapter embodying the present invention to permit borescope access inside a gas turbine engine.
Figure 3:
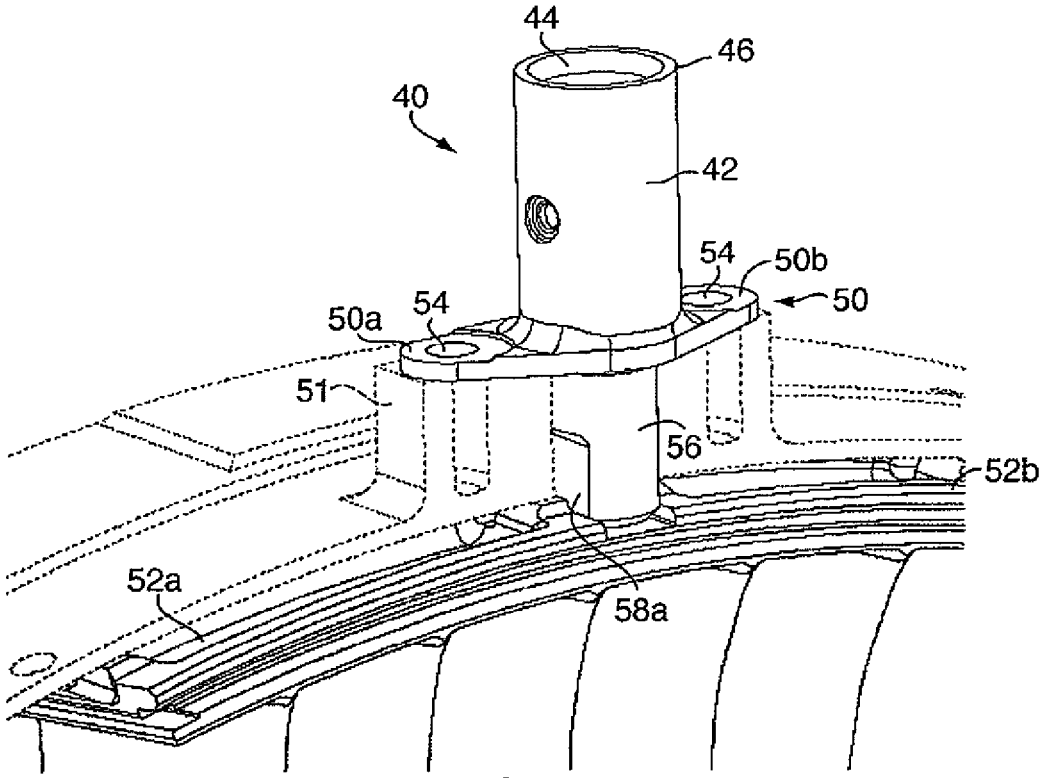
FIG. 3 is a perspective view of the adapter of FIG. 2 coupled to a compressor section of a gas turbine engine.
Figure 4:
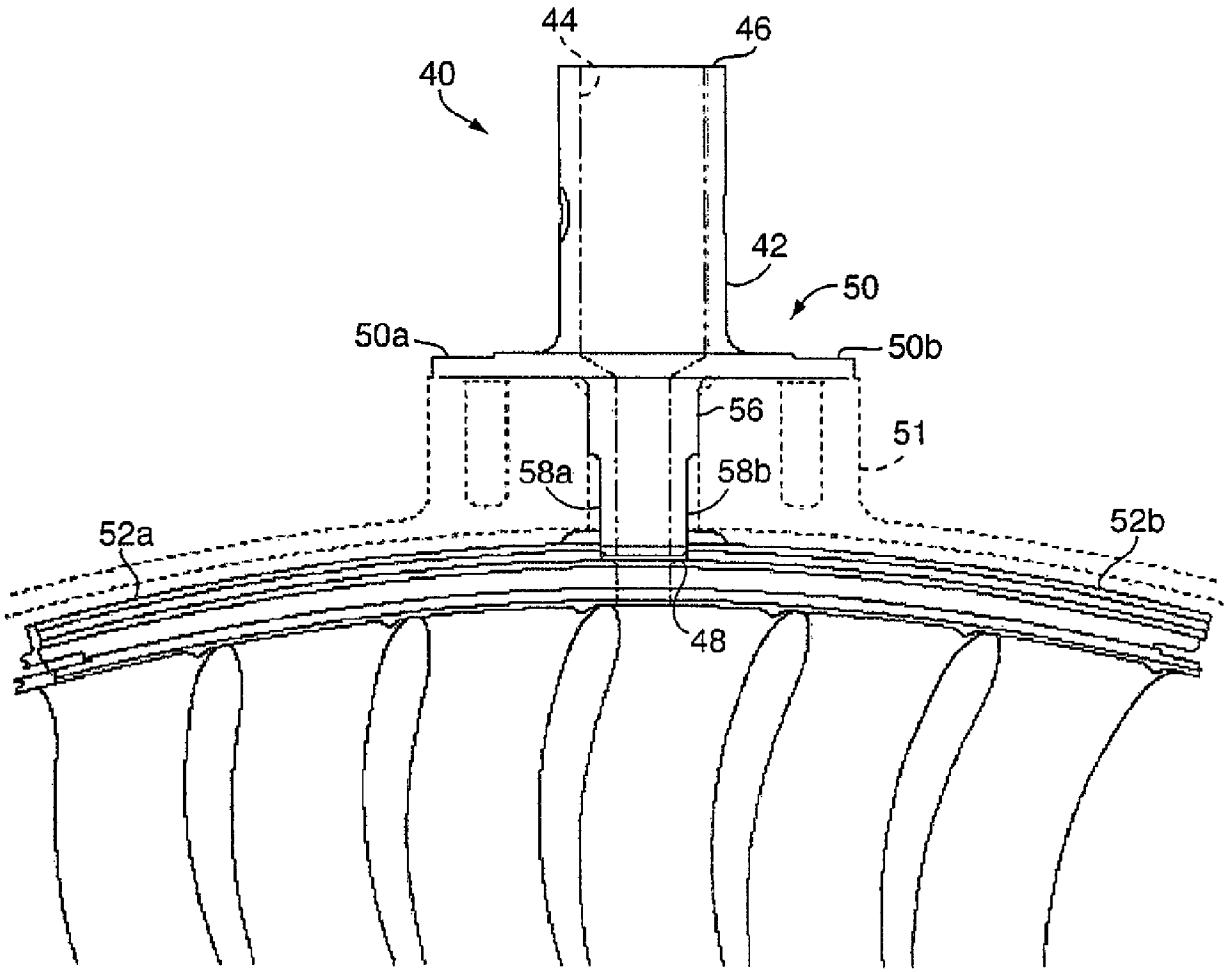
FIG. 4 is an elevational view of the adapter of FIG. 2 coupled to a compressor section of a gas turbine engine.

With reference to FIGS. 2-4, an adapter 40 permits access inside a gas turbine engine such as, for example, the gas turbine engine 10 described by way of example only with respect to FIG. 1. The adapter 40 includes a generally cylindrical body portion 42 defining a bore 44 extending longitudinally therethrough from a first end 46 to a second end 48. As shown in FIGS. 2 and 3, the bore 44 defined by the body portion 42 is generally circular, but can take other shapes. The adapter 40 further includes an attachment portion such as, for example, a flange 50 for circumferentially coupling compressor stator segments 52a, 52b to an outer casing 51 of the gas turbine engine. More specifically, the flange 50 has a first portion 50a extending outwardly from the body portion 42 for coupling the compressor stator segment 52a to the outer casing 51, and includes a second portion 50b, extending outwardly from the body portion in a direction generally opposite to that of the first portion, for coupling the compressor stator segment 52b to the outer casing 51. The first portion 50a and the second portion 50b of the flange 50 each define a hole 54 extending therethrough for receiving a fastener (not shown) to couple the compressor stator segments 52a, 52b to the outer casing 51.

Preferably, a circumferential portion of an outer wall 56 of the body portion 42 is shaped for engaging a similarly shaped portion of at least one compressor stator segment 52 to prevent rotation of the compressor stator segment and the outer casing 51 relative to each other. As best shown in FIGS. 2 and 3, for example, the adapter 40 has two circumferential portions 58a, 58b disposed generally at opposite sides of the outer wall 56 of the body portion 42 relative to each other. The circumferential portions 58a, 58b are each generally flat for engaging a similarly shaped portion of an associated compressor stator segment to prevent rotation of the compressor stator segment and the outer casing relative to each other.

Providing the adapter 40, for coupling the compressor stator segments 52 to the outer casing 51 in a circumferential direction, with a bore 44 for borescope access within a gas turbine engine eliminates variations in the location of a borescope port relative to the outer casing of the gas turbine engine. The adapter 40 in accordance with the present invention allows a smaller and less leak-prone design to be employed, and results in increased engine performance. The gas turbine engine and adapter in accordance with the present invention also reduces the number of machined components, thus resulting in a lighter and less costly engine.

As will be recognized by those of ordinary skill in the pertinent art, numerous modifications and substitutions can be made to the above-described embodiment of the present invention without departing from the scope of the invention. Accordingly, the preceding portion of this specification is to be taken in an illustrative, as opposed to a limiting sense.

What is claimed is:

1. An adapter to permit borescope access inside a gas turbine engine having an outer casing and including a compressor stator having at least one compressor stator segment, the adapter comprising:

a body portion defining a bore extending longitudinally therethrough from a first end to be disposed adjacent to outside surfaces of the outer casing to a second end to be disposed adjacent to an inside surface of the at least one compressor stator segment, the bore permitting a borescope to enter therethrough, *the body portion including an outer wall having a shaped feature configured to engage a correspondingly shaped feature on the at least one compressor stator segment*; and an attachment portion for circumferentially coupling the at least one compressor stator segment to the outer casing, *the attachment portion including a flange extending from the outer wall and configured to be secured to the outer casing*.

2. An adapter as defined in claim 1, wherein the attachment portion includes a flange.

3. An adapter as defined in claim 2, wherein the flange includes a first portion extending outwardly from the body portion for coupling one of the at least one compressor stator segments to the outer casing, and includes a second portion extending outwardly from the body portion in a direction generally opposite to that of the first portion for coupling another of the at least one compressor stator segments to the outer casing.

4. An adapter as defined in claim 3, wherein the first and second portions of the flange each define a hole extending therethrough for receiving a fastener to couple an associated compressor stator segment to the outer casing.

5. An adapter as defined in claim 1, wherein the body portion is generally circular in cross section.

6. An adapter as defined in claim 5, wherein at least one circumferential portion of [an] *the* outer wall of the body portion is shaped for engaging a similarly shaped portion of the at least one compressor stator segment to prevent rotation of the compressor stator segment and the outer casing relative to each other.

7. An adapter as defined in claim 5, wherein at least one circumferential portion of [an] *the* outer wall of the body portion is generally flat for engaging a similarly shaped portion of the at least one compressor stator segment to prevent rotation of the compressor stator segment and the outer casing relative to each other.

8. An adapter as defined in claim 5, wherein two circumferential portions disposed generally at opposite sides of [an] *the* outer wall of the body portion relative to each other are each shaped for engaging a similarly shaped portion of an associated compressor stator segment to prevent rotation of the associated compressor stator segment and the outer casing relative to each other.

9. An adapter as defined in claim 5, wherein two circumferential portions disposed generally at opposite sides of [an] *the* outer wall of the body portion relative to each other are each generally flat for engaging a similarly shaped portion of an associated compressor stator segment to prevent rotation of the associated compressor stator segment and the outer casing relative to each other.

10. An adapter as defined in claim 1, wherein the bore defined by the body portion of the adapter is generally circular.

11. A gas turbine engine comprising:

a compressor section having an outer casing and including a compressor stator and rotor, the compressor stator including a plurality of compressor stator segments;

a combustion section communicating with and disposed downstream of the compressor section relative to a direction of airflow;

a gas turbine section communicating with and disposed downstream of the combustion section relative to a direction of airflow; and an adapter circumferentially coupling at least one of the compressor stator segments to the outer casing, the adapter including a body portion defining a bore extending therethrough from at least an outside surface to an inside surface of an associated compressor stator segment, the bore permitting a borescope to enter therethrough, *the body portion including an outer wall having a shaped feature configured to engage a correspondingly shaped feature on the at least one compressor stator segment, wherein the adapter further includes a flange for coupling the associated compressor stator segment to the outer casing*.

[12. A gas turbine engine as defined in claim 11, wherein the adapter further includes a flange for coupling the associated compressor stator segment to the outer casing.]

13. A gas turbine engine as defined in claim [12] *11*, wherein the flange includes a first portion extending outwardly from the body portion for coupling one of the at least one compressor stator segments to the outer casing, and includes a second portion extending outwardly from the body portion in a direction generally opposite to that of the first portion for coupling another of the at least one compressor stator segments to the outer casing.

14. A gas turbine engine as defined in claim 13, wherein the first and second portions of the flange each define a hole extending therethrough for receiving a fastener to couple an associated compressor stator segment to the outer casing.

15. A gas turbine engine as defined in claim 11, wherein the body portion is generally circular in cross section.

16. A gas turbine engine as defined in claim 15, wherein at least one circumferential portion of [an] *the* outer wall of the body portion is shaped for engaging a similarly shaped portion of the at least one compressor stator segment to prevent rotation of the compressor stator segment and the outer casing relative to each other.

17. A gas turbine engine as defined in claim 15, wherein at least one circumferential portion of [an] *the* outer wall of the body portion is generally flat for engaging a similarly shaped portion of the at least one compressor stator segment to prevent rotation of the compressor stator segment and the outer casing relative to each other.

18. A gas turbine engine as defined in claim 15, wherein two circumferential portions disposed generally at opposite sides of [an] *the* outer wall of the body portion relative to each other are each shaped for engaging a similarly shaped portion of an associated compressor stator segment to prevent rotation of the associated compressor stator segment and the outer casing relative to each other.

19. A gas turbine engine as defined in claim 15, wherein two circumferential portions disposed generally at opposite sides of [an] *the* outer wall of the body portion relative to each other are each generally flat for engaging a similarly shaped portion of an associated compressor stator segment to prevent rotation of the associated compressor stator segment and the outer casing relative to each other.

20. A gas turbine engine as defined in claim 11, wherein the bore defined by the body portion of the adapter is generally circular.

21. A gas turbine engine as defined in claim 11, wherein the adapter is arranged in axial alignment with the compressor section.

* * * * *